US007612888B2

(12) United States Patent  
Serikawa

(10) Patent No.: US 7,612,888 B2
(45) Date of Patent: Nov. 3, 2009

(54) METHOD AND APPARATUS FOR MEASURING HETERODYNE OPTICAL INTERFERENCE UTILIZING ADJUSTABLE POLARIZING PLATE

(75) Inventor: Shigeru Serikawa, Nakai (JP)

(73) Assignee: Hitachi High-Technologies Corporation, Tokyo (JP)

( * ) Notice: Subject to any disclaimer, the term of this patent is extended or adjusted under 35 U.S.C. 154(b) by 57 days.

(21) Appl. No.: 11/681,207

(22) Filed: Mar. 2, 2007

(65) Prior Publication Data

US 2007/0206198 A1 Sep. 6, 2007

(30) Foreign Application Priority Data

Mar. 3, 2006 (JP) ............................. 2006-057364

(51) Int. Cl.
*G01B 11/00* (2006.01)
(52) U.S. Cl. ....................................... 356/485; 356/492
(58) Field of Classification Search ................ 356/485, 356/487, 489, 492, 495
See application file for complete search history.

(56) References Cited

U.S. PATENT DOCUMENTS

| | | | | |
|---|---|---|---|---|
| 4,948,251 | A | * | 8/1990 | Kondo ........................ 356/487 |
| 6,628,402 | B1 | * | 9/2003 | Yamaba et al. .............. 356/489 |
| 7,365,857 | B2 | * | 4/2008 | Holmes et al. ............... 356/487 |

FOREIGN PATENT DOCUMENTS

| | | | |
|---|---|---|---|
| JP | 2002333304 A | * | 11/2002 |
| JP | 2003042710 | * | 2/2003 |
| JP | 2003-207457 | | 7/2003 |

OTHER PUBLICATIONS

Schmitz et al, Bench-top setup for validation of real time, digital periodic error correction, Precision Engineering, vol. 30, Jan. 2006, pp. 306-313.*

* cited by examiner

*Primary Examiner*—Samuel A Turner
(74) *Attorney, Agent, or Firm*—Antonelli, Terry, Stout & Kraus, LLP.

(57) ABSTRACT

A method and an apparatus for measuring optical heterodyne interference in which a reference light and a measurement light differing in frequency is generated. The measurement light is S- or P-polarization light which is irradiated on a target through a polarization light beam splitter, and the reference light is P or S-polarization light which is reflected by a mirror. Interference of the measurement light from the target and the reference light reflected from the mirror is obtained by a light receiving element so as to measure a surface condition or detecting a surface detect on the target. A polarizing plate which is arranged before the light receiving element has an axis rotated so that a signal from the light receiving element becomes a minimum when the reference light is selectively shut off by a light shut off mechanism arranged before the polarization light beam splitter.

6 Claims, 3 Drawing Sheets

METHOD AND APPARATUS FOR MEASURING HETERODYNE OPTICAL INTERFERENCE UTILIZING ADJUSTABLE POLARIZING PLATE

BACKGROUND OF THE INVENTION

The present invention relates to a measuring method of an optical heterodyne interference and a measuring apparatus thereof, and in more details, it relates to a measuring method of an optical heterodyne interference and a measuring apparatus thereof, for enabling an improvement on measuring accuracy while reducing noises on an interference light, in the heterodyne interference measuring apparatus for measuring a recess concave defect, a concave-convex defect or a relative shift amount on a target (i.e., a work), such as, a testing apparatus for detecting a surface defect on a magnetic disk or a substrate thereof, etc., or a surface testing apparatus of the wafer, etc., or a flatness measurement of the wafer, etc.

In accordance with the optical heterodyne interference measuring method, while irradiating a reference light and a measuring light, which are generated lightly differing from each other (from several kHz to several hundreds kHz), upon a target to be measured, so as to bring about interference between the reflection light upon the target and the reference light, and further applying an AC offset frequency (i.e., a beat frequency) onto a DC-like interference fringe obtained through the conventional method, measurement is made on the shift of the target or the like, from a phase change on this AC signal.

This measuring method, since it can be hardly affected from ill influences due to variation of a light amount of a light source, is suitable for detection (measurement) of the condition on the target of low reflectivity, in particular, the condition of a projection and/or concave defect(s) on the magnetic disk and the substrate thereof.

Testing on the projection defect on the surface of the magnetic disk and the substrate thereof with using the optical heterodyne interference measuring apparatus is already known, for example, in Japanese Patent Laying-Open No. 2003-207457 (2003), which was filed by the same applicant.

Also, a capacitance sensor is used for the purpose of measuring a relative shift amount of the target, however in case when measuring it with such the capacitance sensor or the like, in normal, since the measurement is made on the distance from a reference position to a surface of the work, then errors are generated in the reference position because of expansion or contraction due to changes of temperature and secular change of the frame for supporting a member of that reference position, and therefore due to this, there is a problem that it is difficult to make the measurement thereof with high accuracy. Then, various kinds of measurements are conducted, including a flatness measurement with utilizing the optical heterodyne interference measuring apparatus, etc.

BRIEF SUMMARY OF THE INVENTION

For the testing or inspection of the projection or the concave-convex defect on the surface of the magnetic disk and/or the substrate thereof, it is required to detect the projection and/or the concave defect becoming low much more, due to the requirement of high recording density. It is also same to the measurement of the flatness and/or the thickness of the wafer or the like, i.e., demand is strong upon an improvement of accuracy in detection thereof.

Studying the measurement accuracy through the optical heterodyne interference measuring apparatus under such the condition, it can be said that it depends on how much the noises can be reduced on the interference light.

An object of the present invention, for dissolving the problems in such the conventional arts, it is to provide a measuring method of an optical heterodyne interference and a measuring apparatus thereof, for enabling to reduce the noises on the interference light, thereby improving the accuracy of measurement.

For accomplishing such the object, according to the present invention, there are provided a method and an apparatus, for measuring an optical heterodyne interference, comprising the following steps of: generating a reference light and a measurement light, differing from each other in frequency thereof; irradiating the measurement light on a target to be measured through a beam splitter; reflecting the reference light upon a mirror; obtaining an interference light of a reflection light from said target to be measured and the reference light reflected on said mirror, thereby measuring a surface condition or detecting a surface defect on a target to be measured, wherein said reference light is either one of S-polarization light and P-polarization light, while said measurement light is the other one of S-polarization light and P-polarization light, an electric signal of said interference light is obtained upon a light receiving element by obtaining the reflection light from said target to be measured and the reference light reflected upon the reference mirror from said beam splitter through a polarizing plate, wherein an axis of said polarizing plate is so set by rotating said polarization plate that said electric signal obtained from said light receiving element goes down to minimum under condition of shutting off a light transmitting through said beam splitter among said reference light and said measurement light, thereby measuring the surface condition or detecting the surface defect on said target to be measured.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE INVENTION

Hereinafter, embodiments according to the present invention will be fully explained by referring to the attached drawings.

Figure 1:
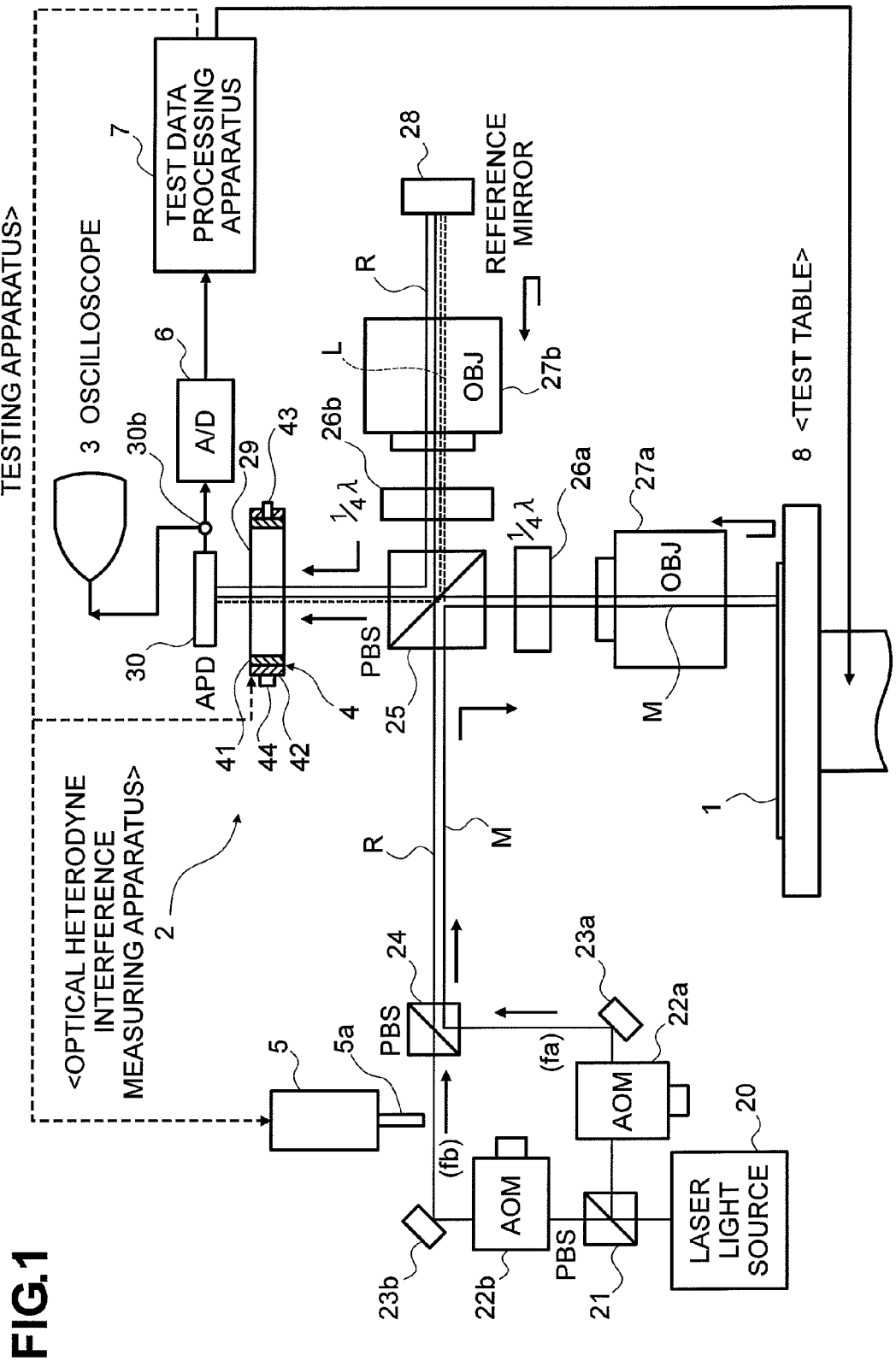
FIG. 1 is a system view of a concave-convex defect testing apparatus for a disk surface, applying therein a measuring method of an optical heterodyne interference, according to an embodiment of the present invention.

FIG. 1 is a view for explaining a concave-convex defect testing apparatus for a disk surface, applying therein a measuring method of an optical heterodyne interference, according to an embodiment of the present invention, FIGS. 2(a) to 2(d) are views for showing the condition where a measurement light passes through a polarizing plate therein, and FIGS. 3(a) to 3(f) are views for showing the waveforms observed on an oscilloscope, which is obtained therein.

In FIG. 1, a reference numeral 10 depicts the concave-convex defect testing apparatus, wherein a reference numeral 1 depicts a disk, as being a target, 2 an optical heterodyne interference measuring apparatus, 3 an oscilloscope, 4 a polarizing plate rotation mechanism, 5 a reference light shutoff mechanism, 6 a D/A converter circuit (D/A), 7 a test data processing apparatus, and 8 a test table for moving the disk 1 into the directions, i.e., Rθ (or XY). The test data processing apparatus 7, driving the inspection table 8 so as to make a spiral scanning on the disk 1, obtains an electric signal about a concave-convex defect(s) thereon, from the optical heterodyne interference measuring apparatus 2, and thereby it detects the concave defect or the convex defect (i.e., projection) through conducting data processing thereon, including the D/A conversion therein. It also memorizes the defect(s) detected, together with coordinate values detected, and it also prints out that data, or display the defect data.

The optical heterodyne interference measuring apparatus 2 comprises a laser light source 20, a polarization light beam splitter 21, acousto-optical modules (AOM) 22a and 22b, mirrors 23a and 23b, polarization light beam splitters 24 and 25, λ/4 wavelength plates 26a and 26b, objective lenses 27a and 27b, a reference mirror 28, a polarizing plate 29, and an APD (avalanche photo-diode) 30.

However, the reference mirror 28 and the disk 1 are disposed or located at the position optically same to each other.

The laser light source 20 generates a laser beam of a predetermined wavelength, so as to irradiate it upon the polarization light beam splitter 21. The polarization light beam splitter 21 divides the beam light received from the laser light source 20, into a S-polarization light component and a P-polarization light component, differing from each other by 90° on the plane of polarization, so as to transmit them to the acousto-optical modules (AOM) 22a and 22b, respectively.

The acousto-optical modules (AOM) 22a modulates the S-polarization light component with a predetermined frequency "fa" to be irradiate upon the polarization light beam splitter 24, as being the measurement light "M" through the mirror 23a. The acousto-optical modules (AOM) 22b modulates the P-polarization light component with a predetermined frequency "fb" to be irradiated upon the polarization light beam splitters 24, as being the reference light "R" through the mirror 23b.

The reference light shutoff mechanism 5 shuts off the reference light "R" by inserting a shutoff plate 5a on an optical path defined between the mirror 23a and the polarization light beam splitter 24, or release it. Shutoff operation of the reference light shutoff mechanism 5 may be driven, manually, or the shutoff or transmission of the reference light "R" may be operated by an actuator, which receives a control signal from the test data processing apparatus 7.

The polarization light beams (i.e., the reference light "R" and the measurement light "M"), each being irradiated and modulated through the polarization light beam splitter 24, respectively, are irradiated upon the polarization light beam splitter 25, wherein the measurement light "M" of the S-polarization light component, which is modulated by the predetermined frequency "fa" at an incident angle 45°, changes the direction thereof by 90°, being reflected herein, to be irradiated upon the disk 1 as the measurement light "M" (i.e., a regular light) through the λ/4 wavelength plate 26a and the objective lens 27a. This measurement light "M" is reflected upon the surface of the disk 1, so that it turns back onto the λ/4 wavelength plate 26a passing through the objective lens 27a, and thereby turns back on to the polarization light beam splitter 25 as being the P-polarization light. And, it advances or propagates as it is, to be incident upon the APD 30 through the polarizing plate 29.

However, the λ/4 wavelength plates 26a and 26b converts the linear polarization light into the circular polarization light in a forward direction, and reversely, in a backwards, so that the reflection wave is changed from the P-polarization light into the S-polarization light, or reversely. Thus, those λ/4 wavelength plates are so set up, as was mentioned.

Then, the reference light "R" of the P-polarization light, which is modulated by the predetermined frequency "fb", propagates straightforward through the polarization light beam splitter 25, and it is irradiated upon the reference mirror 28 as the reference light "R", passing through the λ/4 wavelength plate 26b and the objective lens 27b. A reflection light of this reference light "R", passing through the objective lens 27b, turns back onto the λ/4 wavelength plate 26b and the S-polarization light, and thereon it is reflected to change the direction thereof by 90°, i.e., to be incident upon the APD 30 through the polarizing plate 29.

Normally, the polarizing plate 29 is set at 45°, so that it passes the reflected measurement light "M" of the P-polarization light component and the reflected reference light "R" of the S-polarization light component through the polarizing plate, respectively, at a half (½) of an output comparing to that before passing. For this reason, a polarization beam splitter (PBS) having a high transmission factor is used to this polarizing plate 29.

As a result thereof, the measurement light "M" of the P-polarization light component and the reference light "R" of the S-polarization light component pass through the polarization light plate 29, and received upon an interference filter, i.e., APD 30, to be the interference light. In this instance, the interference light upon the APD 30 is outputted to be an electric signal.

Since the measurement light "M" of the S-polarization light component is reflected upon the polarization light beam splitter 25, to be changed in the direction thereof by 90°, then in that instance is generated a leakage light "L" passing through the polarization light beam splitter 25 to propagate straight forward. That is also irradiated upon the reference mirror 28 through the λ/4 wavelength plate 26b and the objective lens 27b, in the similar manner to the reference light "R". This component of the leakage light "L" of the regular light is of the P-polarization light component, being similar to the reference light, and normally, it is generated at a rate of about 20% thereof.

This leakage light "L" passing through the polarization light beam splitter 25 generates from the linear polarization light to the circular polarization light, due to the configuration error or the like on the reflection surface of the polarization light beam splitter 25, and it appears in the form of the P-polarization light component being same to the reference light "R" to be transmitted through it.

On the other hand, since the reference light "R" propagates straightforward, then the leakage light "L" generating therein is small in the amount thereof, and the leakage light "L", which is generated when the reference light "R" after being reflected upon the reference mirror 28 reflects upon the polarization light beam splitter 25, to be changed the direction thereof by 90°, is not on the side of the APD 30. The present invention pays attention onto this aspect.

The leakage light "L" (the P-polarization light component), propagating straightforward through the polarization light beam splitter 25, passes through the λ/4 wavelength plate 26b to be irradiated upon the reference mirror 28, and after being reflected upon that reference mirror 28, it turns back, while being changed into the S-polarization light component, similar to the reference light "R". When being reflected upon the polarization light beam splitter 25 to be changed the direction thereof by 90°, this overlaps with the measurement light "M" on the way of turning back, and this appears to be noises on the measurement light "M". Then, herewith, reduction is made on the leakage light "L" of the measurement light "M" propagating straightforward, while passing through that the polarization light beam splitter 25.

A polarizing plate rotation mechanism 4 comprises a inner-side ring member 41 for holding the disc-like polarizing plate 29, and also an outer-side ring member 42, which is provided on the outer side thereof, under the condition of being fixed (those ring members are shown by the cross-section views thereof, in FIG. 1. Please see FIGS. 2(a) and 2(b)), wherein the inner-side ring member 41 can rotate along the outer-side ring member 42.

A reference numeral 43 depicts an operation lever, being connected with the inner ring member 41, passing through a gutter-like opening (not shown in the figure) formed in the outer ring member 42, for allowing the inner ring member 41 to rotate, and thereby rotating the polarizing plate 29. On the opposite side of this operation lever 43 is provided a stoppage screw 44 for fixing the inner ring member 41 onto the outer ring member 42, so as not to rotate.

Figure 2A:
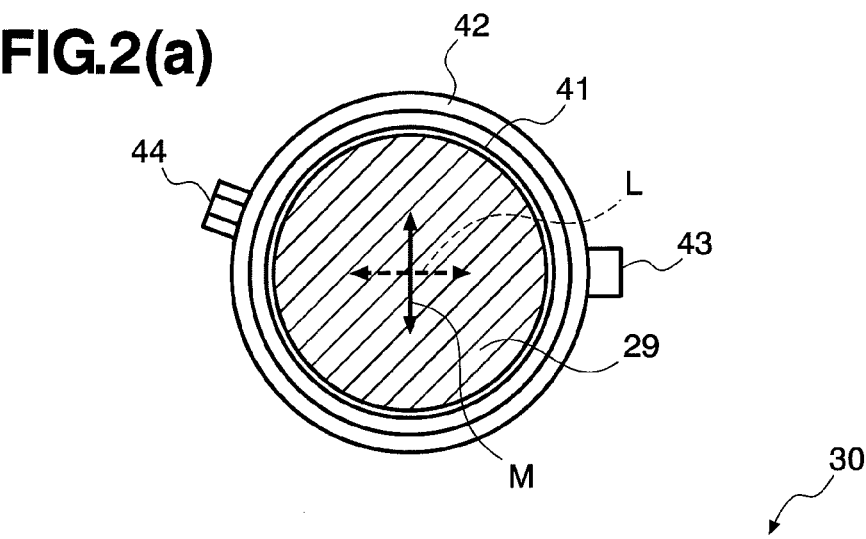
FIGS. 2(a) to 2(d) are views for showing the condition where a measurement light passes through a polarizing plate therein.
Figure 2B:
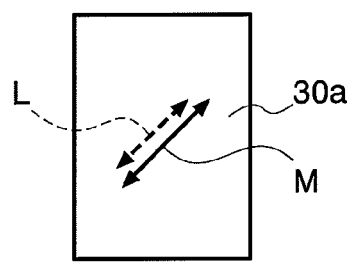
Figure 2C:
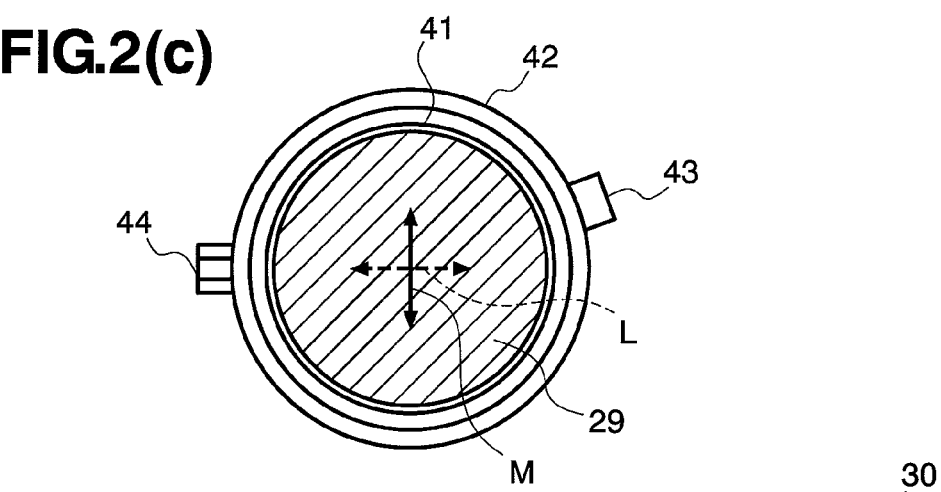
Figure 2D:
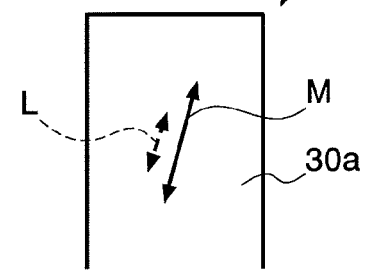

As is shown in FIG. 2(a), when setting the axial angle of the polarizing plate 29 at 45°, then the measurement light "M" (see a vertical arrow of a solid line) of the P-polarization light reflected upon the disk 1 and the S-polarization light component as the reflection light of the leakage light "L" reflected upon the reference mirror 28 (see a horizontal arrow of a solid line) pass or transmit through the polarizing plate 29, they are received upon the light receiving surface 30a of the APD 30, respectively, as is shown in FIG. 2(b).

An arrow of a broken line depicts the S-polarization light component as the reflection light of the leakage light "L" passing through the polarizing plate 29, and a solid line depicts the measurement light "M" of the P-polarization light component passing through the polarizing plate 29. However, in this figure, the components of the leakage light "L" are shown while exaggerating them a little bit.

Then, an oscilloscope 3 is connected at a junction between an output terminal 30b of the APD 30 (see FIG. 1) and the D/A 6, and the reference light shutoff mechanism 5 is operated, so as to shutoff the reference light "R". Then, by means of the operation lever 43 of the polarizing plate rotation mechanism 4, the axis of the polarizing plate 29 is rotated in an anticlockwise direction, in FIG. 2(a), i.e., passing through the P-polarization light component of the measurement light "M" but not the S-polarization light component of the reflected leakage light "L", thereby observing a light receiving level on the oscilloscope 3.

Figure 3A:
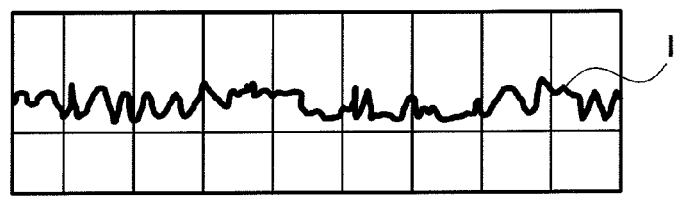
FIGS. 3(a) to 3(f) are views for showing the waveforms observed on an oscilloscope, which is obtained therein.

FIGS. 3(a) to 3(f) shows the waveforms of the light receiving levels of a glass disk, which can be observed on the oscilloscope 3, wherein FIG. 3(a) is an output waveform of the APD 30 when setting the polarizing plate 29 at an angle 45°.

Since the reference light "R" is shutoff by the reference light shutoff mechanism 5, the waveform, which can be observed on the oscilloscope 3 in this case, i.e., an output of the APD 30 is detection of an interference light of the measurement light "M" and the leakage light "L".

Then, the polarizing plate rotation mechanism 4 is rotated back into the anticlockwise direction through the manual operation at the operation lever 43 thereof, up to a positing where an interference "I" disappear or it goes down to the minimum on the waveform observed on the oscilloscope 3. That angle lies on the rotation position ranging from 20° to 40° into the clockwise direction, assuming that an axial angle of the polarizing plate 29 is 0°, when it passes through only the P-polarization light component. Then, an appropriate rotation position of the polarizing plate can be obtained where the leakage light "L" does not constitute the noises.

Figure 3B:
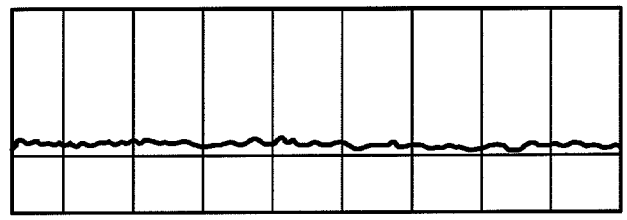

As a result thereof, at a predetermined rotation position of the polarizing plate 29, the waveform of FIG. 3(a) comes into the condition similar to a level fluctuation of reference voltage of the APD 30, as is shown in FIG. 3(b). Of course, in this instance, the axial angle is not set at zero (0). To the last, it is set within a range where the measurement light "M" and the reference light "R" and the interference light "I" can be obtained below a certain level.

Under this condition, the stoppage screw 44 is rotated so that the inner ring member 41 is fixed onto the outer ring member 42, and the axial angle of the polarizing plate 29 is fixed while stopping the polarizing plate 29 from rotation thereof.

Figure 3C:
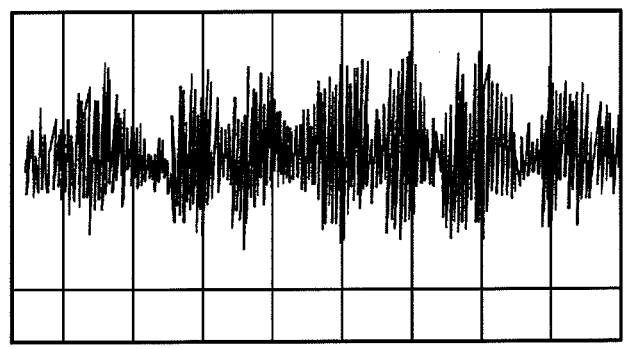

And, under the condition shown in FIG. 3(b) is released the operation of the reference light shutoff mechanism 5 and the reference light "R" is generated, as a result thereof, it is possible to obtain an interference signal (i.e., a measurement signal) as shown in FIG. 3(c).

Figure 3D:
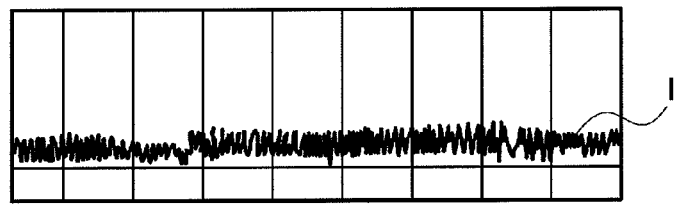
Figure 3E:
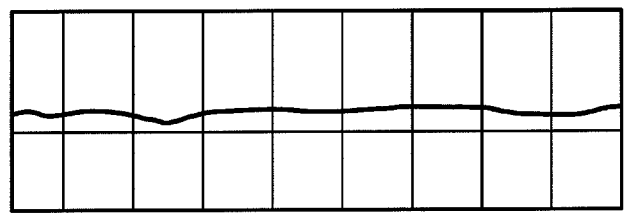
Figure 3F:
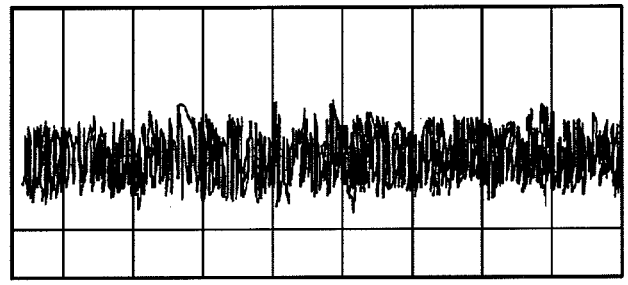

Cases where the measurements are made on the disk attached with a magnetic film in the place of the glass disk are shown in FIGS. 3(d) to 3(e), and the respective one correspond to waveforms shown in FIGS. 3(a) to 3(c).

As was explained in the above, within the embodiment, the optimal rotation position of the polarizing plate 29 is obtained through the manual operation of the operation lever 43 of the polarizing plate rotation mechanism 4, however it is also possible to provide a rotation driving mechanism on the polarizing plate rotation mechanism 4, so as to rotate the polarizing plate 29 through electro-motion drive. In this instance, as is shown by a dotted line in FIG. 1, the rotation position is selected where the output of the APD 30 goes down to the minimum by means of the test data processing apparatus 7, under the condition of shutting off the reference light "R" is shut off through the reference light shutoff mechanism 5 with an aid of the control signal from the test data processing apparatus 7, and then the drive of the polarizing plate rotation mechanism 4 is stopped at that position.

Or, within the embodiment is used the APD, as the light receiving element, however it is of course, there may be applied a pinhole diode, a CCD, or other light receiving elements, in the place thereof.

The polarizing plate provided in front of the light receiving element is set at 45° on the axis thereof; however, the initial setting of the axis of the polarizing plate may be within a range from 20° to 40°, from a beginning. With this, it is possible to rotate it into the clockwise direction from 20° or into the anticlockwise direction from 40°.

Further, within the present embodiment, the measurement light is S-polarization light and the reference light is P-polarization light, but they may be reversed.

In this manner, according to the present invention, within the method for measuring the optical heterodyne interference, generating a reference light and a measurement light, and irradiating the measurement light on the target to be measured through a beam splitter, wherein only a light beam of a reflection light is obtained by shutting off the transmission light irradiating on the beam splitter, and an axis of the polarizing plate is so set that the light of the leakage light in that transmission direction, which is received upon a light receiving element, goes down to the minimum, and therefore it is possible to reduce a level of noises generated by the leakage light, on an electric signal of the interference light obtained form the light receiving element.

As a result thereof, within the method for measuring an optical heterodyne interference and the apparatus for measuring thereof, for measuring a surface condition or detecting a surface defect on a target to be measured, it is possible to obtain an improvement on the accuracy of measurement.

While we have shown and described several embodiments in accordance with our invention, it should be understood that disclosed embodiments are susceptible of changes and modifications without departing from the scope of the invention. Therefore, we don not intend to be bound by the details shown and described herein but intend to cover all such changes and modifications that fall within the ambit of the appended claims.

What is claimed is:

1. A method for measuring an optical heterodyne interference, comprising the following steps of:

generating a reference light and a measurement light having different frequencies, the reference light being one of a P-polarization light and a S-polarization light and the measurement light being the other of the P-polarization light and the S-polarization light;

irradiating the measurement light on a target to be measured through a polarization light beam splitter and a first λ/4 wavelength plate which is positioned between the polarization light beam splitter and the target;

irradiating the reference light upon a reference mirror through a second λ/4 wavelength plate which is positioned between the polarization light beam splitter and the reference mirror;

obtaining an electric signal indicative of an interference light by a light receiving element arranged to detect the interference light of the measurement light reflected from the target and passed through the first λ/4 wavelength plate, the polarization light beam splitter, and a polarizing plate positioned between the polarization light beam splitter and the light receiving element, and of the reference light reflected by the reference mirror and passed through the second λ/4 wavelength plate, the polarization light beam splitter, and the polarizing plate; and adjusting an axis of the polarizing plate by a polarizing plate rotation mechanism so that the electric signal outputted by the light receiving element becomes a minimum when the reference light is shut off by a light shutoff mechanism positioned between the polarized light generator and the polarization light beam splitter so as to selectively shut off the reference light, thereby enabling measurement of a surface condition or a surface defect on the target to be measured.

2. The method for measuring an optical heterodyne interference, as described in the claim 1, wherein the target to be measured is a disk and the electric signal enables detection of a projection or concave defect on the disk.

3. The method for measuring an optical heterodyne interference, as described in the claim 1 wherein the light receiving element is an ADP and the electric signal is observed by connecting an oscilloscope to an output terminal of the APD.

4. An apparatus for measuring an optical heterodyne interference, comprising:

a polarized light generator configured to generate a reference light and a measurement light having different frequencies, the reference light being one of a P-polarization light and a S-polarization light and the measurement light, being the other of the P-polarization light and the S-polarization light;

a polarization light beam splitter arranged to transmit the reference light in a direction of a reference mirror and to reflect the measurement light in a direction of a target to be measured;

a first λ/4 wavelength plate positioned between the polarization light beam splitter and the target;

a second λ/4 wavelength plate positioned between the polarization light beam splitter and the mirror;

a light receiving element arranged to detect an interference light of the measurement light and the reference light and to output an electric signal indicative of the interference light;

a polarizing plate, positioned between the polarization light beam splitter and the light receiving element configured to transmit the measurement light reflected from the target to be measured and passed through the first λ/4 wavelength plate and the polarization light beam splitter and the reference light reflected from the reference mirror and passed through the second λ/4 wavelength plate and the polarization light beam splitter;

a polarizing plate rotation mechanism configured to rotatably support the polarizing slate and to fix an axis of the polarizing plate as rotated into an angular position;

a light shutoff mechanism , positioned between the polarized light generator and the polarization light beam splitter, which is configured to selectively shut off the reference light; and wherein the axis of the polarizing plate is set in an angular position by the polarizing plate rotation mechanism so that the electric signal outputted by the light receiving element becomes a minimum when the reference light is shut off by the light shutoff mechanism.

5. The apparatus for measuring an optical heterodyne interference, as described in the claim 4, wherein the target to be measured is a disk, the measurement light is irradiated upon the disk through the first λ/4 wavelength plate, a reflection light of the measurement light is turned back to the polarization light beam splitter through the first λ/4 wavelength plate, the reference light is irradiated upon the reference mirror through the second λ/4 wavelength plate, and a reflection light of the reference light is turned back to the polarization light beam splitter through the second λ/4 wavelength plate, thereby enabling detection of a projection or concave defect on the disk as the surface detect.

6. The apparatus for measuring an optical heterodyne interference, as described in the claim 5, wherein the light receiving element is an ADP, the electric signal is observed by connecting an oscilloscope to an output terminal of the APD.

* * * * *